Reissued Jan. 13, 1931 Re. 17,930

UNITED STATES PATENT OFFICE

DAVID A. LEGG, OF TERRE HAUTE, INDIANA, ASSIGNOR TO COMMERCIAL SOLVENTS CORPORATION, OF TERRE HAUTE, INDIANA, A CORPORATION OF MARYLAND

ART OF BUTYL-ACETONIC FERMENTATION

No Drawing. Original No. 1,668,814, dated May 8, 1928, Serial No. 139,016, filed October 1, 1926. Application for reissue filed November 27, 1929. Serial No. 410,243.

My invention relates to the art of butyl-acetonic fermentation and has for its principal object the development of a reliable method of conducting the butyl-acetonic fermentation process in such a manner that good yields of products are obtainable even in the presence of adverse fermentation conditions.

The butyl-acetonic fermentation of carbohydrates has been carried out on a large manufacturing scale for some years past. In this process a sterile mash of amylaceous or saccharine carbohydrates is prepared, and the warm mash is inoculated with a culture of butyl-actetonic bacilli, whereupon fermentation proceeds at a temperature of about 36° C., this being the optimum fermentation temperature maintained by the bacilli without the outside application of heat.

In the case of sterile corn mash of 8% concentration, a normal fermentation is complete within thirty-six to seventy-two hours, and there is a "solvent yield" of about 25% by weight of the dry corn. This "solvent yield" represents the total quantity of butyl alcohol, acetone, and ethyl alcohol obtained. The fermented mash is then distilled in the ordinary manner to remove the solvents present in the aqueous solution.

Butyl-acetonic bacilli are present in nature and may be isolated and purified according to the method of Weizmann (U. S. Patent 1,315,585). The butyl-acetonic bacillus has previously been described by various names, including:—*Bacillus granulobacter pectinovorum*, *Bacillus amylobacter*, *Clostridium butyricum*, *Bacillus butyricus*, *Bacillus butylaceticum*, *Bacillus acetobutylicum*, *Clostridium acetobutylicum*, etc. Slight differences due to culturing methods and treatment have been observed but all strains have certain definatory characteristics.

The butyl-acetonic bacillus is chiefly characterized by its ability to produce, from carbohydrates, a solvent mixture of butyl alcohol (about two parts); acetone (about one part) and, usually, small quantities of ethyl alcohol. A mixture of hydrogen gas and carbon dioxide gas is given off during fermentation. During the first stages of fermentation the mash acidity rapidly increases to a "peak" of about 4–6 c. c. of N/10 sodium hydroxide per 10 c. c. of mash. Later, during fermentation, the mash acidity is lessened until, in a normal case it is about 2–3 c. c. when fermentation ceases. The butyl-acetonic bacillus, further, has the power to operate on starch directly, and does not require a preliminary conversion of this material to sugar.

The bacillus is an anaerobe but is ordinarily employed under practical aerobic conditions. Young vegetative cells stain yellow with iodine, but later, as sporulation approaches, the cells take on clostridial form, whereupon they stain blue or violet with iodine owing to the presence of granulose.

Young vegetative cells are actively motile with from nine to eighteen peritrichous flagella. They are at first gram-positive, but after eighteen to twenty-four hours shrivelled gram-negative cells increase in numbers.

While a pure culture butyl-acetonic bacilli will produce a factory solvent yield of 25% based on dry corn, or a similar figure when other carbohydrates are fermented, the history of the art has shown recurrent periods of lowered yields due to abnormal fermentation. There are known in the art two distinctly different types of abnormal fermentation which are ordinarily classified as "contaminated fermentation" and "sluggish fermentation".

Contaminated fermentation, as the name implies, is due to the presence in the fermenting mash of other organisms along with the butyl-acetonic bacilli. Lactic acid producing organisms such as "*B. volutans*", once present in the mash, attack the carbohydrate present with great activity and may diminish or almost entirely preclude the normal fermentation. The prevention of contamination in the butyl-acetonic fermentation art has been the subject of much study and effort, and those skilled in the art are now well able to prevent the appearance of contaminating organisms in the fermentation by proper precautions in sterilization and operation, and if contaminating organisms do find their way into the mash it is still possible to keep them under control or destroy them by various processes of treatment such as resterilization, or neutralization of the mash acidity.

Sluggish fermentation, on the other hand, is a type of abnormality which has previously baffled the workers in the art. The phenomenon occurs intermittently and for no apparent reasons. It is usually epidemic in character and of sudden incidence.

When sluggish fermentation is once noticed in one or more of the vessels employed in a butyl-acetonic fermentation plant within about twenty-four hours it will frequently become apparent in hundreds of disconnected vessels of various sizes, including laboratory cultures. Even cultures which have been stored for years in sealed tubes in spore form, when transferred to and grown in a sterile mash are not immune from sluggishness during a plant epidemic period.

Sluggish fermentation is primarily characterized by a prolonged acidity peak and by the extreme slowness with which the end point is reached. An epidemic of sluggishness greatly reduces the total solvents producible from apparatus of a given size and standard capacity in a stated time. During such an epidemic, production schedules are overthrown and great loss ensues.

Fully as important as the factor of "slowness" which occurs in sluggish fermentation, is the factor of diminished yield of solvents. Sluggish fermentations are rarely complete fermentations—all of the fermentable carbohydrate is not fermented, and an appreciable loss ensues, both in reduced solvent yield and in the increased time required for fermentation.

I have now discovered a means of operating the butyl-acetonic fermentation process in a manner that prevents the loss of time and loss of solvents otherwise incurred through sluggishness, and a process which gives uniformly higher plant yields than those known in the art.

My invention is best understood in connection with my theory for its operativeness though it is of course understood that my invention stands distinct from the theory. The recurrent and epidemic character of sluggishness suggests that it is a "disease" of the butyl-acetonic bacilli. The precise circumstances under which a fermentation process, operating normally, first falls under the influence of sluggishness are not known. It is certain, however, that when the mash in one fermenting vessel becomes affected with sluggishness there is usually a sudden appearance of the disease in a great number of other vessels.

The slightest contact of any portion of a sluggish mash with another mash is sufficient to induce sluggishness. If a sample of sluggish fermenting mash is filtered, first through a Buechner filter to remove all solids and then through a Berkefeld filter to remove bacteria, one drop of the filtrate placed in normal fermenting mash is sufficient to induce sluggishness. Indeed, if one drop of the filtrate is diluted one million times, a drop of the resultant diluted liquid will frequently induce sluggishness in a normally fermenting mash. Likewise the sluggishness may be propagated indefinitely by transferring one drop of the Berkefeld filtrate from a mash undergoing sluggish fermentation to a fresh mash, fermenting the fresh mash for about twenty-four hours, securing a Berkefeld filtrate from it, and repeating the cycle. Such transferring does not involve true dilution, as the sluggishness—whatever its cause—becomes as pronounced in the second mash as it was in the first.

On the basis of these facts, and on others not reported here, it would appear that sluggish fermentation is caused by a living organism of ultra-microscopic dimensions. If this is the case it may be either a saprophyte living in association with the butyl-acetonic organism, or it may be a true parasite or bacteriophage.

I have now discovered a process whereby butyl-acetonic bacilli may be rendered resistant to epidemics of sluggishness, whereby a normal yield of solvents is obtainable at all times from carbohydrate fermentation without any interference from epidemics of sluggishness, or, in the language of my theory, quite regardless of the presence of an ultra-virus or bacteriophage in the mash. I achieve this end by immunizing cultures of the butyl-acetonic bacillus to the presence of ultra-virus (according to my theory) or at any rate to whatever influencing agent is present in a sluggishly-fermenting mash or the Berkefeld filtrate therefrom.

I accomplish this immunization by repeatedly subcultivating butyl-acetone bacilli in the presence of the filtrate from a sluggish fermentation, the culture being "heat-shocked" before each transfer.

More specifically, the immunization of the butyl-acetonic bacillus may be accomplished as follows:

A sterile carbohydrate mash consisting, for example, of 6% corn mash is prepared and inoculated with a spore culture of butyl-acetonic bacilli. It is then "heat-shocked" for three minutes at 100° C., after which there is added a small portion, one or more drops, of clear liquid obtained from a carbohydrate mash undergoing a sluggish butyl-acetonic fermentation by filtering the mash first to remove all solids and second through a Berkefeld filter to remove bacteria. Fermentation is then allowed to proceed at a temperature of about 36° C. for four or more days—i. e., until spores have developed. This spore culture is then used to inoculate fresh corn mash which is again "heat-shocked" for about three minutes at 100° C., and treated with two drops of the filtrate as previously mentioned. The second fermentation is allowed to proceed as before and additional transfers with shocking and with filtrate addition are made—that is, the process is repeated. At the end of about ten such treatments the culture thus obtained in spore form at the end of the last treatment will ordinarily be found to be immunized in respect to sluggish fermentation, and, if not, the described treatment of the culture is continued until immunity is attained. The extent of immunity is measured by inoculating a sterile mash with the "immune" culture, adding a few drops of the Berkefeld filtrate of a sluggish fermentation, and allowing fermentation to proceed. A fermentation giving a normal solvent yield within a normal time indicates that the culture is completely immunized.

In making such tests one employs as controls a normal non-immunized culture for fermenting a sterile carbohydrate mash, the result being taken as an index of yield and of fermentation time, and one also employs a normal non-immunized culture for fermenting a sterile carbohydrate mash in the presence of filtrate from a sluggish fermentation, the result being compared with the result obtained from immunized cultures.

The improved results attained with immunized cultures are illustrated by the following tabulation:

| Culture employed | Number of immunizing treatments given culture | Average solvent yield of 4 flask fermentations in presence of "ultra-virus" at the end of 72 hours |
|---|---|---|
| R 1 | 10 | 24.2 |
| R 2 | 10 | 25.3 |
| R 3 | 10 | 25.8 |
| R 4 | 10 | 23.2 |
| M | None | 6.8 |
| S | None | 15.8 |
| S 1 | None | 19.6 |
| R 1 | 17 | 26.3 |
| R 2 | 17 | 25.8 |
| R 3 | 17 | 26.5 |
| R 4 | 17 | 24.9 |
| M | None | 22.3 |
| S | None | 18.5 |
| S 1 | None | 7.9 |

In addition to clearly disclosing the beneficial result attained by the use of immunized cultures the tabulation also is useful in showing that the process of immunization does not transform low-yielding cultures into high-yielding cultures. For example, Culture R 4, while immunized and thus capable of producing a normal fermentation in the presence of the ultra-virus, gives consistently lower results than its companion cultures. If high solvent yields are to be attained, the culture selected to be immunized must be a normal high-yielding culture under optimum fermentation conditions.

It will also be noted that while the control (non-immunized) cultures shown in the tabulation consistently give much lower yields in the presence of the ultra-virus than immunized cultures, the actual solvent yield of individual non-immunized cultures varies with different tests. For example, "Culture M" gave a yield of 6.8% in one case and 22.3% in another case. This uncertainness of result is, of course, characteristic of biological processes. The point of importance is that non-immunized cultures give lower average yields than immunized cultures.

While in describing my process for immunizing cultures I have stated that cultures should be "heat-shocked" for three minutes at 100° C., it should be understood that temperature and duration of "heat-shocking" may be varied in accordance with well-known bacteriological technique. The purpose of "heat-shocking" is to eliminate vegetative forms of the bacillus, leaving only the spores to germinate. So long as this result is attained, the precise method of eliminating attenuated vegetative cells, during the immunization of the cultures, of which "heat-shocking" is my specific example, may be varied.

When an immunized culture is added to a carbohydrate mash containing the filtrate from sluggish fermentation there is produced a normal, rapid, and complete fermentation with a good solvent yield. This, of course, is the effect observed when a laboratory test of the quality of the culture thus obtained is made. Practically, in manufacturing operations, the beneficial effect of the use of such a culture is profound. Sluggish fermentation, as such, disappears from the factory.

While the ultra virus believed to cause sluggishness may still have recurrent periods of activity such that extreme sluggish fermentation would occur if ordinary cultures were used, when immunized (resistant) cultures are employed there is no period of sluggish fermentation actually experienced in manufacturing operations, and the butyl-acetonic fermentation process may be operated to consistently produce good yields of solvents.

A further very great advantage accrues from the use of immunized (resistant) butyl-acetonic bacilli in conducting the butyl-acetonic fermentation process—namely that consistently higher yields of solvents are obtained at all times in the manufacturing operations than are obtained when corresponding non-immunized cultures are used. For example, under normal plant conditions and using non-immunized cultures the solvent yield, based on dry corn has seldom been over 24%, when reckoned over an operating period of several months. However, when my immunized (resistant) cultures are employed, the solvent yield under plant conditions is maintained consistently at 25% or more, based on dry corn. In this connection it should be noted that generally in the practice of the art, solvent yields obtained in large scale manufacturing operations are not as great as the best yields obtained in laboratory experiments.

There is probably a close connection between the ability of my immunized (resistant) cultures to produce normal solvent yields from mashes containing the ultra-virus or bacteriophage causing sluggishness, and their ability to produce higher yields of solvents in plant practice at all times, whether or not sluggishness is apparent.

Thus, it is possible that in plant practice the ultra-virus causing sluggishness is almost always present and that actual epidemics of sluggishness are due to an increase of the virulence of the ultra-virus. At other times its virulence may be only sufficient to cause a slight lowering of the final solvent yield obtained from non-immunized cultures, without producing the characteristic symptoms of sluggish fermentation.

While I have described the process of immunization as being preferentially conducted with some Berkefeld filtrate from a sluggish fermentation, the filtrate from any other bacterial filter might be employed. Although any portion of a sluggishly-fermenting mash might be used to introduce the virus, the use of unfiltered mash is not preferred, since such procedure will introduce strains of the bacillus other than the one undergoing treatment, for the filtrate is not ordinarily obtained from the culture being immunized. While I have described specifically the use of corn as a carbohydrate for fermentation it should be pointed out that any fermentable carbohydrate, saccharine or amylaceous, is useful with my immunized (resistant) cultures. In the appended claims, my improved cultures are described as "immunized", and it should be understood that this term is used as synonymous with the term "resistant", as was heretofore indicated.

Now, having described my invention, I claim the following as new and novel:—

1. A process for producing an immunized culture of butyl-acetonic bacilli which comprises repeatedly sub-cultivating said bacilli in carbohydrate media in the presence of some sluggishly-fermenting carbohydrate mash, the cultures being "heat-shocked" at each transfer to eliminate attenuated vegetative cells.

2. A process for producing an immunized culture of butyl-acetonic bacilli which comprises repeatedly sub-cultivating said bacilli in carbohydrate media in the presence of some sluggishly-fermenting carbohydrate mash, the cultures being "shocked" for three minutes at 100° C. at the time of each transfer to eliminate attenuated vegetative cells.

3. A process for producing an immunized culture of butyl-acetonic bacilli which comprises repeatedly sub-cultivating said bacilli in carbohydrate media in the presence of a portion of a Berkefeld filtrate of a carbohydrate mash which is undergoing sluggish butyl-acetonic fermentation, the cultures being "heat-shocked" at each transfer to eliminate attenuated vegetative cells.

4. A process for producing an immunized culture of butyl-acetonic bacilli which comprises sub-cultivating said bacilli ten or more times in a carbohydrate medium in the presence of a portion of a Berkefeld filtrate of a carbohydrate mash which is undergoing sluggish butyl-acetonic fermentation, the cultures being "heat-shocked" at each transfer to eliminate attenuated vegetative cells.

5. In a process for the production of butyl alcohol and acetone from a fermentable carbohydrate mash, the step which comprises inoculating said mash with an immunized culture of the hereinabove-described butyl-acetonic bacillus.

6. In a process for the production of butyl alcohol and acetone from a fermentable amylaceous mash, the step which comprises inoculating said mash with an immunized culture of the hereinabove-described butyl-acetonic bacillus.

7. In a process for producing an immunized culture of the hereinabove-described butyl-acetonic bacillus for fermentation of a carbohydrate mash, the steps which consist in inoculating a sterile carbohydrate mash with butyl-acetonic bacilli, eliminating the attenuated vegetative cells in said culture, adding to said mash liquid from a sluggishly-fermenting mash, and allowing fermentation to proceed.

8. In a process for producing an immunized culture of the hereinabove-described butyl-acetonic bacillus for fermentation of a carbohydrate mash, the steps which consist in repeatedly subcultivating said bacilli in carbohydrate media in the presence of some sluggishly-fermenting carbohydrate mash, the attenuated vegetative cells present in the cultures being eliminated at each transfer.

9. A process for the production of butyl alcohol and acetone which comprises preparing a sterile carbohydrate mash, and inoculating said mash with an immunized culture of the hereinabove-described butyl-acetonic bacillus.

10. A process for the production of butyl alcohol and acetonic which comprises preparing a sterile saccharine carbohydrate mash and inoculating said mash with an immunized culture of the hereinabove-described butyl-acetonic bacillus.

11. A process for the production of butyl alcohol and acetone which comprises inoculating a sterile carbohydrate mash with an immunized culture of the hereinabove described butyl-acetonic bacillus, permitting the fermentation to go to completion, and recovering the butyl alcohol and acetone from the fermented mash.

12. A process for the production of butyl alcohol and acetone which comprises preparing a sterile amylaceous mash, and inoculating said mash with an immunized culture of the hereinabove-described butyl-acetonic bacillus.

13. A process for the production of butyl alcohol and acetone which comprises inoculating a sterile amylaceous mash with an immunized culture of the hereinabove-described butyl-acetonic bacillus, permitting the fermentation to go to completion, and recovering the butyl alcohol and acetone from the fermented mash.

14. In a process for producing an immunized culture of the hereinabove-described butyl-acetonic bacilli for fermentation of a carbohydrate mash, the steps which consist in successively subcultivating and heat shocking said bacilli in the presence of material from a sluggishly-fermenting carbohydrate mash.

15. In a process for producing an immunized culture of the hereinabove-described butyl-acetonic bacilli for fermentation of a carbohydrate mash, the step which consists in cultivating said bacilli in carbohydrate media in the presence of some sluggishly-fermenting carbohydrate mash.

16. In a process for producing an immunized culture of the hereinabove-described butyl-acetonic bacilli for fermentation of a carbohydrate mash, the step which consists in cultivating said bacilli in the presence of a portion of a Berkefeld filtrate of a carbohydrate mash which is undergoing sluggish butyl-acetonic fermentation.

In testimony whereof, I affix my signature.

DAVID A. LEGG.